United States Patent Office — 3,074,983 — Patented Jan. 22, 1963

1

3,074,983

PROCESS FOR MANUFACTURE OF PHENOLATED FATTY ACIDS

Fred O. Barrett and Charles G. Goebel, Cincinnati, Ohio, assignors to Emery Industries, Inc., Cincinnati, Ohio, a corporation of Ohio No Drawing. Filed Apr. 26, 1961, Ser. No. 105,549
8 Claims. (Cl. 260—413)

This invention relates to a method of producing a non-ester addition product of a phenolic compound and an unsaturated fatty acid.

Condensation of an aromatic compound with an unsaturated fatty acid occurs at a double bond of the acid and involves addition of a hydrogen atom to one of the unsaturated carbon atoms of the acid and of the aromatic residue to the other carbon atom. The condensation product is essentially a straight chain aliphatic acid with an aromatic side chain.

The condensation of an unsaturated fatty acid and a phenolic compound results in products having unusual properties in that they contain both hydroxyl and carboxyl groups. The presence of these groups in the reacting ingredients poses a manufacturing problem in that the hydroxyl group of the phenolic compound tends to react with the carboxyl group of the unsaturated fatty acid to form a phenolic ester rather than the desired addition compound. To overcome this tendency, the practice heretofore has been to react the phenolic compound with a methyl or other lower alkyl ester of the unsaturated acid. With the carboxy group already esterified, the problem of phenolic ester formation does not exist. However, the resulting product is unattractive since it contains but one reactive group, i.e., —OH. The methyl or other ester-linked radical in the product may later be removed from the addition product by hydrolysis, but this is a difficult and expensive operation.

In carrying out the above reaction between phenol compound and unsaturated acid ester, the practice has been to use catalysts such as clay, sulfuric acid, or a Friedel-Crafts catalyst such as aluminum chloride, boron trifluoride, or the like. When using a clay catalyst the practice has been to dry the clay prior to use, presumably to improve its effectiveness.

It is an object of this invention to provide a direct efficient method for the production of phenolated unsaturated fatty acids. A more particular object is to provide a method of this character which minimizes the simultaneous formation of the phenolic ester.

The nature of still other objects of the invention will be apparent from a consideration of the descriptive portion to follow.

We have discovered that when a phenolic compound selected from the group consisting of phenol and lower alkyl-substituted phenols is reacted with an unsaturated fatty acid of natural origin at temperatuers of about 125 to 200° C. in the continuing presence of a minor percentage of a crystalline clay mineral and of from about 0.5 to 2.5% of free water, i.e., that readily available as such and not present as water of hydration. Under these conditions, it has been found that the desired addition reaction, whereby a nuclear carbon atom of the phenolic compound becomes bonded to one of the unsaturated carbon atoms of the acid reactant, proceeds (to form) efficiently with little concomitant formation of the corresponding ester compound or other loss of available carboxyl or hydroxyl groups in the respective reactants. Specifically, by practicing the reaction in this fashion the formation of phenolic ester is reduced to less than one-third the amount which would otherwise result under the most favorable conditions heretofore employed.

2

Amounts of water ranging from .5% to 2.5% based on the weight of the reactants, have been found to retard ester formation but not to significantly decrease the yield of the phenolic addition product. Water levels outside this range tend to interfere with the reaction and result in decreased yields as well as in other disadvantageous product characteristics. Optimum results are obtained as the total amount of free, or available water in the system is from 1.0 to 2.0%. The phenolic and acid reactants each normally contain about 0.1–0.2% available water. However, these amounts are disregarded in calculating the available water content of the system.

Any of the unsaturated fatty acids as found in the naturally occurring oils and fats may be employed in a practice of this invention. Representative acids are undecylenic, oleic, linoleic, linolenic, palmitoleic and erucic acids as well as isomeric modifications of such acids. The mixed unsaturated acids which may be derived from cotton, soya, linseed oils or from other fats or oils containing a predominant amount of unsaturated acids may be employed and also tall oil fatty acids.

The phenolic reactant may be phenol itself, or one of the various derivatives thereof wherein the phenyl nucleus is substituted by one or more lower alkyl groups of from 1 to 4 carbon atoms such as methyl, ethyl, propyl, isopropyl, butyl or isobutyl. However, a preferred class of phenolic compounds for use in practicing the invention is made up of phenol and its methyl-substituted derivatives such as cresol and xylenol.

The clay minerals which may be used in a practice of this invention are surface active clay minerals such as montmorillonite, hectorite, halloysite, attapulgite and sepiolite. The various montmorillonite-rich bentonites may also be used. In general, clay minerals of the montmorillonite type constitute a preferred class for use in the present invention. The amount of clay mineral employed in the reaction mixture may range from about 1 to 20%, based on the weight of the other reactants, though from a practical operating standpoint, a preferred range is from 2 to 10%.

As normally sold, most of the commercial clay minerals usefully employed in this process contain from about 10 to 20% of water as free water and not as water of hydration. Thus, depending on the amount of water present in the particular clay and the proportions of clay utilized in the reaction system, the free water content of the clay will provide part or all of the necessary water.

In carrying out the reaction it is preferable to employ an excess of the phenolic compound to force the reaction to completion and then remove the excess of phenolic compound by vacuum distillation rather than to employ molar proportions or an excess of fatty acids, as the temperatures required to remove the unreacted fatty acides by distillation even under high vacuum are so high that the product tends to resinify.

The excess of phenolic compound insures practically complete reaction of the unsaturated fatty acid. The completeness of the reaction can therefore be determined either from the weight of the non-volatile residue or from that of the volatile, phenolic component. A normal non-volatile residue, but coupled with a higher than theoretical neutralization equivalent and a lower than normal hydroxyl value, is an indication that the phenolic compound and the unsaturated fatty acid have reacted but that considerable ester has formed as evidenced by the deficiency in hydroxyl and carboxyl groups.

The following examples illustrate the practice of the invention in various of its embodiments.

EXAMPLE 1

In the operations presented in this example, 100 parts of oleic acid were reacted with 100 parts of cresol in the presence of 10 parts of an acid-activated montmorillonite clay (Grade 1 Filtrol, a product of the Filtrol Corporation) and varying amounts of added water, as indicated by the data presented in the table given below. In Run 1 thereof, which is inserted for comparative purposes, the clay used was first predried and contained essentially no free water. In the other runs the clay used contained from 12–15% of available water. Each run was conducted by placing the reactants in a stirred autoclave which was then closed, brought to the 160° C. reaction temperature and maintained thereat for 4 hours. At the conclusion of each run, the autoclave was cooled, opened, and the product distilled at 200° C. at 20 mm. Hg to remove unreacted cresol. The remaining, nonvolatilized product was when weighed and analyzed to determine its neutralization equivalent (N.E.), saponification equivalent (S.E.) and hydroxyl value. The ester content of the product was calculated from the N.E. and S.E. values, and data allied thereto.

*Table*

Runs showing reaction of cresol with oleic acid in presence of clay mineral at varying water levels.

| Run No. | Clay | Added $H^2O$ (percent based on total charge) | Total $H_2O$ in system (percent) | Yield of non-volatile prod. (percent of theory) | N.E. | S.E. | Hydroxyl value | Ester (percent calculated) |
|---|---|---|---|---|---|---|---|---|
| | Theoretical values | | | 100 | 390 | 390 | 144 | 0 |
| 1 | Predried | 0 | 0 -0.2 | 102.5 | 456 | 378 | 114 | 17 |
| 2 | Normal | 0 | 0.6-0.75 | 99 | 435 | 373 | 114 | 14 |
| 3 | do | 0.5 | 1 -1.25 | 98 | 410 | 371 | 120 | 9.3 |
| 4 | do | 1.0 | 1.6-1.75 | 96 | 402 | 366 | 116 | 9.2 |
| 5 | do | 1.5 | 2.1-2.25 | 93 | 390 | 365 | 108 | 6.6 |
| 6 | do | 2.0 | 2.6-2.75 | 88 | 376 | 351 | 88 | 6.9 |

The results obtained in Run 1 above, conducted in the absence of water, indicate the product formed contained a relatively large proportion of ester. Conversely, Run 6, which was also inserted for comparative purposes and was conducted in the presence of from about 2.6 to 2.75% of free water, shows that the yield of the desired addition product is rapidly falling off (as has the hydroxyl value), when the values are compared with those of Run 5 where the total free water content was about 2.1 to 2.25%. Run 2, conducted without water other than that naturally present in the clay, though not run under the most favorable conditions, gave results which were significantly better than those obtained in (dry) Run 1, thus supporting the fact that at least 0.5 weight percent of free water should be present in the system.

EXAMPLE 2

100 parts of oleic acid and 100 parts of cresol were heated in a glass flask equipped with a stirrer, therometer and water-cooled reflux condenser arranged to return condensed water to the flask, the system also containing 10 parts of Grade 1 Filtrol, the free water content of which had been increased to 16%. Heating in the flask continued for 4 hours at 160° C. with agitation. The product of the reaction was cooled to approximately 100° C., the Filtrol removed by filtration and unreacted cresol removed by distillation under 20 mm. vacuum at a temperature of 200° C. The resulting product, recovered in the amount of 138.4 parts, or 100% of theory, showed by titration a neutralization equivalent of 428 and a hydroxyl value of 117.

EXAMPLE 3

Commercial grade oleic acid (100 parts), cresol (100 parts) and Grade 1 Filtrol (10 parts) containing 12–15% free water, were processed in a stirring type autoclave. The autoclave was purged of air with carbon dioxide and the contents heated to 160–165° C., this temperature range was maintained for 4 hours. The contents of the autoclave were cooled, filtered and distilled to 150° C. under a pressure of 1 mm. Hg. The distillation residue amounted to 115 parts (85% of theory) and had a neutralization equivalent of 405, a saponification equivalent of 368, and a hydroxyl value of 102.

EXAMPLE 4

Fatty acids (100 parts) from the rectification of crude tall oil fatty acids, phenol (100 parts) and Grade 1 Filtrol (10 parts) which contained 12–15% of free water, were heated (after purging with carbon dioxide) in a rocking type autoclave for 4 hours at 160° C. The contents of the autoclave were cooled, filtered and distilled as described in Example 2. Phenolated tall oil fatty acids (66.7 parts) of neutralization equivalent 423, saponfication equivalent 386, and hydroxyl value 110 where obtained as still residue.

EXAMPLE 5

In this operation 200 grams of symmetrical xylenol were reacted with a like amount of oleic acid in the presence of 20 grams of an acid-activated montmorillonite clay mineral (Grade 20 Filtrol) containing approximately 12% available water. The reaction was conducted in a small, rocking type autoclave for 3 hours at 160° C., a pressure of 20–25 p.s.i.g. developing in the vessel as it reached reaction temperatures. At the end of the reaction period the xylenol and unreacted acids were removed from the product by distillation at 2–3 mm. Hg, leaving a nonvolatile resdue in a theoretical yield of 70%. This residue had a N.E. of 460 (theory equals 404), an acid value of 122, a S.E. of 385 and a hydroxyl value of 110 (theory equals 139).

The phenolated fatty acids of the type which are produced by the practice of the method of this invention may be used for a variety of industrial purposes such as anti-oxidants, corrosion inhibitors, anti-rust compounds, and oil additives.

We claim:

1. A method for the production of addition products of a phenolic compound and an unsaturated fatty acid which comprises, reacting at least one fatty acid selected from the group consisting of undecylenic, oleic, linoleic, linolenic, palmitoleic and erucic acids with a phenolic compound selected from the group consisting of phenol and lower-alkyl substituted phenols, said reaction being conducted in the continuing presence of a minor percentage of a surface active clay mineral and of from about 0.5 to 2.5% of available water, at temperatures of from about 125 to 200° C.

2. A method for the production of addition products of a phenolic compound and an unsaturated fatty acid which comprises, reacting at least one fatty acid selected from the group consisting of undecylenic, oleic, linoleic, linolenic, palmitoleic and erucic acids with an excess, over the stoichiometrically required amount, of a phenolic compound selected from the group consisting of phenol and lower-alkyl substituted phenols, said reaction being conducted in the continuing presence of from 1 to 20% of a clay mineral of the montmorillonite type and of from about 0.5 to 2.5% of available water, at temperatures of from 125 to 200° C.

3. The process of claim 2 wherein there is added the step of distilling off the excess of the phenolic reactant to obtain the desired addition product as the distillation residue.

4. A method for the production of addition products of a phenolic compound and an unsaturated fatty acid which comprises, reacting at least one fatty acid selected from the group consisting of undecylenic, oleic, linoleic, linolenic, palmitoleic and erucic acids with an excess, over the stoichiometrically required amount, of a phenolic compound selected from the group consisting of phenol and lower-alkyl substituted phenols, said reaction being conducted in the continuing presence of from 1 to 10% of a clay mineral of the montmorillonite type and of from about 1 to 2% of available water, at temperatures of from 125 to 200° C.

5. The process of claim 2 wherein the phenolic reactant is phenol.

6. The process of claim 2 wherein the phenolic reactant is cresol.

7. The process of claim 2 wherein the phenolic reactant is xylenol.

8. The process of claim 2 wherein the fatty acid reacted with the phenolic compound comprises a mixture of fatty acids as distilled from tall oil.

No references cited.